United States Patent [19]

Goloff

[11] 3,999,903
[45] Dec. 28, 1976

[54] COMBINATION THRUST AND JOURNAL BEARING
[75] Inventor: Alexander Goloff, East Peoria, Ill.
[73] Assignee: Caterpillar Tractor Co., Peoria, Ill.
[22] Filed: Oct. 14, 1975
[21] Appl. No.: 622,327
[52] U.S. Cl. .................................. 418/53; 308/72
[51] Int. Cl.² ...................................... F04F 11/00
[58] Field of Search ............ 74/60, 25; 308/15, 72, 308/35; 418/49–53; 73/258

[56] References Cited
UNITED STATES PATENTS
3,946,617  3/1976  Moriarty .......................... 308/72 X Primary Examiner—Joseph F. Peters
Assistant Examiner—Gene A. Church
Attorney, Agent, or Firm—Wegner, Stellman, McCord, Wiles & Wood

[57] ABSTRACT

An improved combination journal and thrust bearing particularly suited for use in slant axis rotary mechanisms of the type including a housing defining a chamber with an operating cavity, a shaft journalled in the housing and including an angularly offset portion within the chamber, and a rotor within the chamber journalled on the angularly offset portion. The improved bearing includes an hour glass configuration in the angularly offset portion and the provision of a ring-like bearing structure operatively interposed between the angularly offset portion and the rotor to slidably journal the rotor on the shaft. The radially inner surface of the bearing is configured to substantially mate with the hour glass configuration.

8 Claims, 2 Drawing Figures

COMBINATION THRUST AND JOURNAL BEARING

BACKGROUND OF THE INVENTION

This invention relates to bearings. More specifically, it relates to an improved combination journal and thrust bearing. The improved bearing is particularly suited for use in slant axis rotary mechanisms such as engines, compressors, pumps or the like; although other applications will readily occur to those skilled in the art.

As is well known, rotors employed in slant axis rotary mechanisms are journalled on an angularly offset portion of the mechanism main shaft. Conventionally, a generally cylindrical thrust collar is disposed on the angularly offset portion and is embraced by a pair of thrust bearings. In addition, two journal bearings are employed to be interposed between other parts of the angularly offset portion and the rotor.

The difficulty with such systems for providing both journal and thrust bearings resides in a number of areas. Because multiple parts are employed, manufacturing tolerances must be high. This, of course, adds to the expense of the mechanism. In addition, such designs are redundant and the bearings tend to buck each other during operation of the mechanism due to eccentricities developed either by loading in the apparatus or during manufacturing operations.

SUMMARY OF THE INVENTION

It is the principal object of the invention to provide a new and improved bearing structure which will act as a combination thrust and journal bearing. More specifically, it is an object of the invention to provide such a bearing that is particularly suited for use in rotary mechanisms such as slant axis mechanisms.

An exemplary embodiment of a bearing made according to the invention includes a rotary mechanism provided with a shaft. Means are provided to define an hour glass configuration on the shaft. An element to be journalled on the shaft includes an opening which is disposed about the hour glass configuration. A ring-like bearing is interposed between the element and within the opening and the hour glass configuration. The bearing has a radially inner surface configured to substantially mate with the hour glass configuration in slidable engagement therewith.

When the foregoing structure is a slant axis rotary mechanism, the element to be journalled on the shaft comprises the rotor and the hour glass configuration is disposed on an angularly offset portion in the shaft. The shaft in turn is journalled within a housing defining a operating cavity for the mechanism and the rotor is located within such cavity.

According to a preferred embodiment of the invention, the hour glass configuration is defined by a curve. Preferably, for ease of manufacture, the curve is a toroid curve.

In one embodiment of the invention, the bearing is defined by plural arcuate segments and one end of the hour glass configuration on the shaft is notched to a low disposition of the segments in place.

According to another embodiment of the invention, the bearing again is formed as a plurality of segments and the element to be journalled is formed so as to allow assembly of the segments to the hour glass configuration prior to assembly of the element to the shaft.

Other objects and advantages will become apparent from the following specification taken in connection with the accompanying drawings.

DESCRIPTION OF THE PRIOR ART

Figure 1:
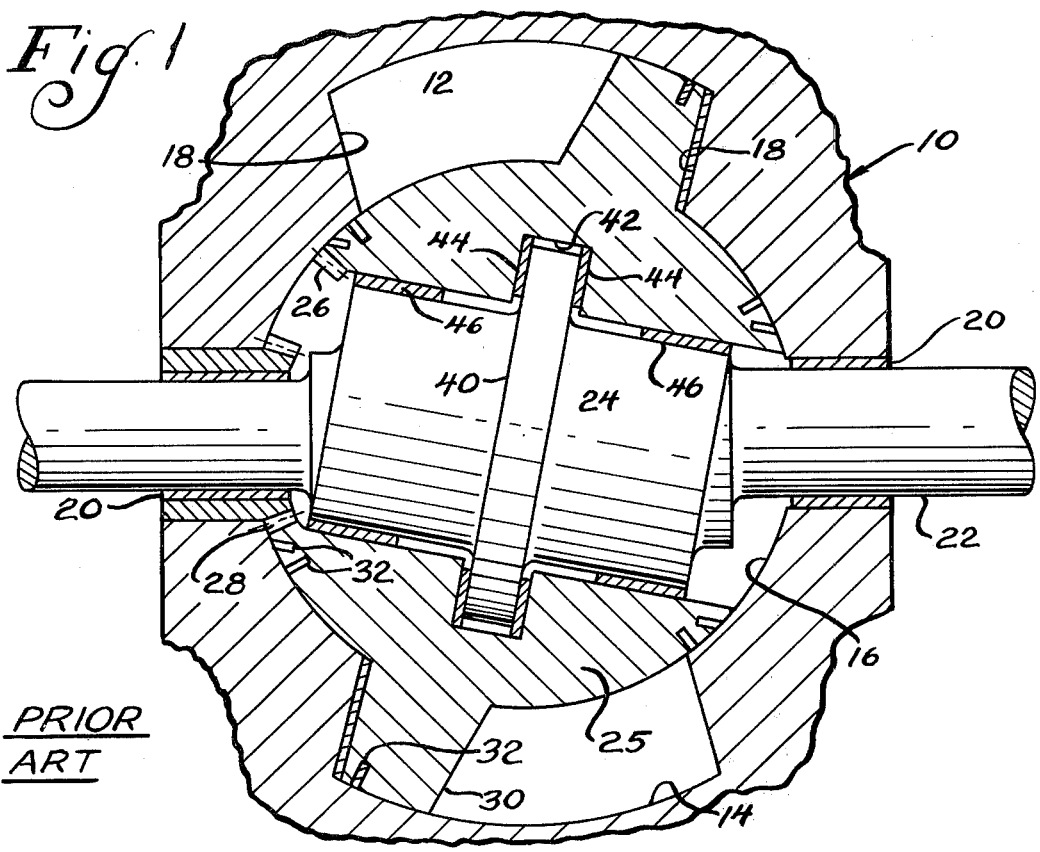
FIG. 1 is a sectional view of a slant axis rotary mechanism made according to the teaching of the prior art.

In an exemplary embodiment of a prior art slant axis rotary mechanism in the form of an engine is illustrated in FIG. 1. It is to be understood, however, that mechanisms such as that illustrated in FIG. 1 are not limited to use as engines, but may be used as pumps, compressors, etc.

The engine includes a housing, generally designated 10, defining a chamber 12, a portion of which acts as an operating cavity, as is well known. The chamber 12 is defined by a radially outer spherical wall 14 and a radially inner spherical wall 16 connected by opposed, generally radially extending side walls 18.

The housing 10, by means of bearings 20, journals a shaft 22 having an angularly offset portion 24 disposed within the chamber 12. A rotor 25 is disposed within the chamber 12 about the angularly offset portion 24 and carries an internal ring gear 26 in engagement with a timing gear 28 so as to establish the proper timed relative rotation between the shaft 22 and the rotor 25.

The rotor 25 has a peripheral, radially outwardly extending flange 30 which is provided with a variety of seals 32 which seal against the illustrated ones of the walls 14, 16 and 18 as illustrated and in slidable engagement therewith.

The angularly offset portion 24 includes a radially outwardly extending, peripheral thrust collar 40 received within an inwardly opening groove 42 in the rotor 24. Flanking opposite sides of the thrust collar 40 are thrust bearings 44.

Journal bearings 46 are disposed about each end of the angularly offset portion 24 to journal the rotor 25 thereon. Thus, the typical prior art construction includes four bearings. Two thrust bearings 44 are employed, as are two journal bearings 46. Each of the bearings 44 and 46 in the prior art construction may be composed of one or more segments, depending upon the mode of assembly of the rotor 25 to the angularly offset portion 24.

DESCRIPTION OF THE PREFERRED EMBODIMENTS

An exemplary embodiment of a slant axis rotary mechanism made according to the invention is illustrated in FIG. 2, again in the form of an engine. However, it is to be understood that, like the prior art construction, it, too, may be employed as a pump, compressor or the like.

Figure 2:
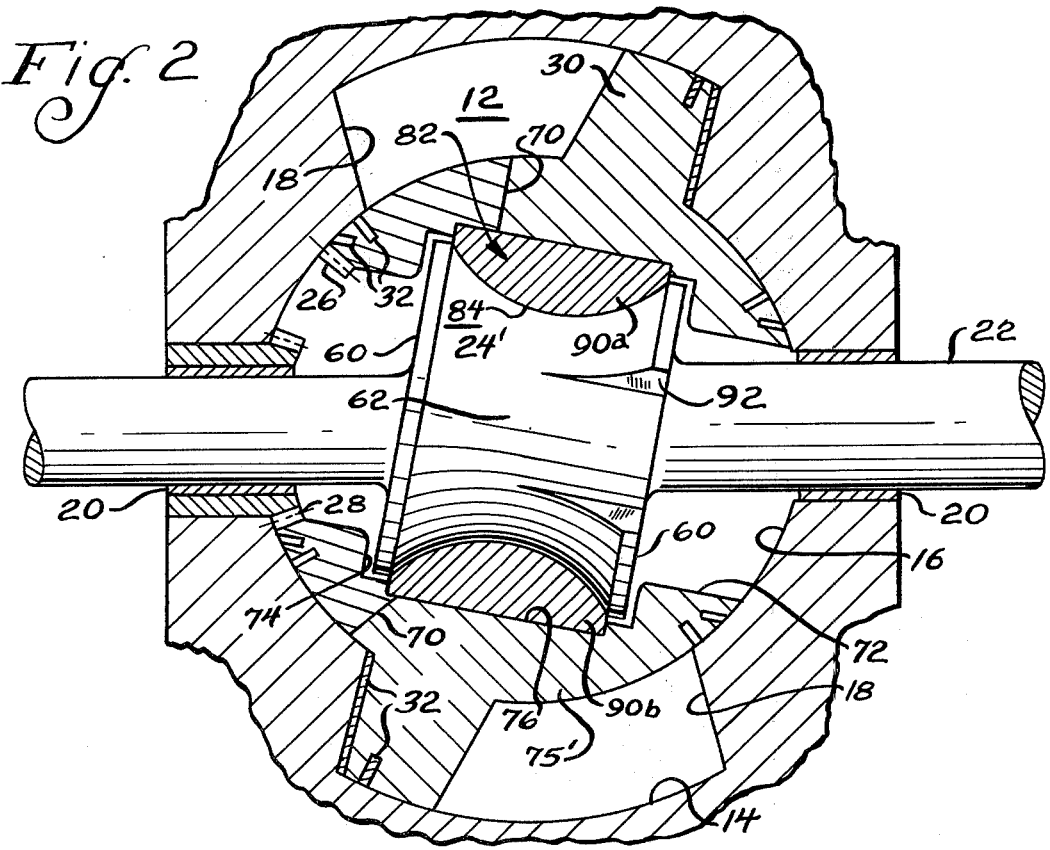
FIG. 2 is a similar sectional view of a slant axis rotary mechanism made according to the present invention.

The mechanism illustrated in FIG. 2 is, in virtually all respects, identical to the prior art structure illustrated in FIG. 1, save for the means by which the rotor is journalled on the angularly offset portion of the shaft and the configuration of the angularly offset portion. Thus, like elements have been given like reference numerals and for expediency will not be described in further detail hereinafter. Where constructional details differ in the same element, that element's reference numeral will be primed.

Referring to FIG. 2, the shaft 22 is provided with an angularly offset portion 24' which as can be seen has an hour glass configuration. That is, the ends 60 of the angularly offset portion 24' have greater diameters than the center area 62 thereof. According to the preferred embodiment of the invention, the narrowed area 62 between the ends 60 is defined by a curve, or a combination of curves, such as a hyperbola, parabola, ellipse or toroid. For ease of construction, a toroidal configuration is preferred.

The rotor 25' will generally be formed of two parts, being split in its hub as at 70 for assembly purposes. Securing means for securing the two parts of the rotor together, normally cap screws (not shown) will be employed.

The rotor 25' has a central opening 72 through which the shaft extends and in which the angularly offset portion 24' is disposed. As seen in FIG. 2, a stepped groove 74 is employed for this purpose, with the shallower part of the groove being of sufficient size so as to accommodate, without interference, the angularly offset portion 24'. The deeper part 76 of the groove 74 captivates the radially outer portion of a ring-like bearing, generally designated 82. If desired, the ring-like bearing 82 may be clamped in place upon assembly of the parts of the rotor together or, if desired, may float or rotate relative to the rotor 25'. In the case of the latter, the bearing 82 will preferably be made of an aluminum alloy. In the case of the former, steel-back aluminum may be employed.

The radially inner surface 84 of the bearing 82 is in sliding engagement with the narrowed area 62 of the angularly offset portion 24'. Thus, the radially inner surface of the bearing 82 is configured to substantially mate with the hour glass configuration of the angularly offset portion 24'.

To avoid edge loading, it is preferable that the radii of the curve generating the radially inner surface 84 of the bearing 82 be slightly smaller than the radius of the curve defining the hour glass configuration of the angularly offset portion 24'. The difference in the two radii is kept at a minimum, being on the order of 0.05mm.

Normally, the bearing 82 will be formed of a plurality of segments such as the segments 90a and 90b. The segments may be applied in place before the rotor 25' is applied to the angularly offset portion where a split rotor construction such as illustrated in FIG. 2 is illustrated. Alternately, one end 60 of the angularly offset portion 24' may be notched as illustrated at 92 sufficiently to allow insertion of the segments from the side if it is preferred to locate the rotor 25' on the shaft prior to the assembly of bearings to the structure. In the latter case, a section of the hour glass configuration (not shown) conforming to that removed in forming the notch 92 may be added to maintain the segments in place. It is also preferable that the notch 92 be so located on the shaft in a zone where no significant bearing loading takes place.

It will be observed that the bearing system illustrated in FIG. 2 provides the same load-bearing area as the bearing system illustrated in FIG. 1. Specifically, the width of the bearing 82, i.e., the dimension extending from one end 60 to the other end 60 of the angularly offset portion 24', is equal to the sum of the corresponding dimensions of the two journal bearings 46 shown in FIG. 1. Similarly, the difference in diameter between the ends 60 of the angularly offset portion 24' and the narrowed area 62 at its minimum diameter is equal to the difference in diameters of the radially inner edge of the thrust bearing 44 and the radially outermost point at which they contact the thrust collar 40. Thus, in both cases, the projected area remains the same, providing the same load-carrying capacity.

However, the construction illustrated in FIG. 2 represents a substantial improvement over the prior art structure in that only a single bearing as opposed to four is required, thereby simplifying assembly. Moreover, redundacy in design is completely avoided so that bucking between bearings encountered in the prior art construction is absent in a structure made according to the invention. Thus, structure made according to the invention provides a single bearing structure that acts as a combination thrust and journal bearing.

What is claimed is:
1. A slant axis rotary mechanism comprising:
   a housing defining a chamber including an operating cavity;
   a shaft journalled in said housing and including an angularly offset portion within said chamber, said angularly offset portion having an hour glass configuration;
   a rotor within said chamber and having a central opening, said angularly offset portion being within said opening; and
   ring-like bearing means operatively interposed between said angularly offset portion and said rotor and slidably journalling said rotor on said shaft, the radially inner surface of said ring-like bearing means being configured to substantially mate with said hour glass configuration,
   whereby said bearing means acts as a combination journal and thrust bearing for said rotor.

2. The slant axis rotary mechanism of claim 1 wherein said hour glass configuration is a curve.

3. The slant axis rotary mechanism of claim 2 wherein said curve is a toroid.

4. The slant axis rotary mechanism of claim 1 wherein the radially outer surface of said ring-like bearing means is statically captured by said rotor.

5. In a rotary mechanism, the combination of:
   a shaft;
   means defining an hour glass configuration on said shaft;
   a rotor journalled on said shaft and having an opening disposed about said hour glass configuration; and
   a ring-like bearing interposed between said rotor within said opening and said hour glass configuration, said bearing having a radially inner surface configured to substantially mate with said hour glass configuration in slidable engagement therewith,
   whereby said bearing acts as a combination thrust and journal bearing for said rotor.

6. The rotary mechanism of claim 5 wherein said shaft includes an angularly offset portion, said hour glass configuration being disposed on said angularly offset portion.

7. The rotary mechanism of claim 5 wherein said bearing is defined by plural arcuate segments and one end of said hour glass configuration is notched to allow disposition of said segments in place.

8. The rotary mechanism of claim 5 wherein said bearing is formed of at least two segments and said rotor is formed so as to allow assembly of said segments to said hour glass configuration prior to assembly of said rotor to said shaft.

* * * * *